United States Patent
Park et al.

(10) Patent No.: US 12,244,681 B2
(45) Date of Patent: Mar. 4, 2025

(54) ELECTRONIC DEVICE USING BLOCKCHAIN AND OPERATING METHOD THEREOF

(71) Applicant: SAMSUNG ELECTRONICS CO., LTD., Suwon-si (KR)

(72) Inventors: Chanjoon Park, Suwon-si (KR); Yewon Kim, Suwon-si (KR); Gyuhyun Shin, Suwon-si (KR); Dasom Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 262 days.

(21) Appl. No.: 18/075,025

(22) Filed: Dec. 5, 2022

(65) Prior Publication Data

US 2023/0093968 A1    Mar. 30, 2023

Related U.S. Application Data

(63) Continuation of application No. PCT/KR2021/006659, filed on May 28, 2021.

(30) Foreign Application Priority Data

Jun. 3, 2020    (KR) ........................ 10-2020-0067207

(51) Int. Cl.
*G06Q 20/06*    (2012.01)
*G06Q 20/38*    (2012.01)
(Continued)

(52) U.S. Cl.
CPC ........... *H04L 67/60* (2022.05); *G06Q 20/065* (2013.01); *G06Q 20/389* (2013.01); *H04L 67/10* (2013.01)

(58) Field of Classification Search
CPC .. G06Q 20/065; G06Q 20/389; G06Q 20/367; G06Q 20/3678; G06Q 20/385;
(Continued)

(56) References Cited

U.S. PATENT DOCUMENTS 10,679,217 B2    6/2020 Li
2016/0098730 A1    4/2016 Feeney
(Continued)

FOREIGN PATENT DOCUMENTS

JP    2012-503449 A    2/2012
JP    2020-129283 A    8/2020
(Continued)

OTHER PUBLICATIONS

Scalable Distributed Ledger System, Transaction Privacy And Combating Fraud, Theft And Loss (Year: 2020).*

(Continued)

*Primary Examiner* — Radu Andrei
*Assistant Examiner* — Nakia Leffall-Allen
(74) *Attorney, Agent, or Firm* — Sughrue Mion, PLLC

(57) ABSTRACT

An electronic device includes a communication circuit and a processor connected to the communication circuit. The processor may be configured to generate first transaction data comprising a first piece of transaction data for transferring a part of unused transaction output values of a first address from the first address to a second address, transmit the first transaction data to a server, receive status information indicating a transmission delay status of the first transaction data in a blockchain network from the server, receive recommendation fee information on transmission of the first transaction data, from the server, and generate second transaction data comprising a second piece of transaction data for transferring the part of the unused transaction output values (Continued)

of the first address from the first address to the second address, based on the recommendation fee information.

20 Claims, 12 Drawing Sheets

(51) Int. Cl.
*H04L 67/10* (2022.01)
*H04L 67/60* (2022.01)

(58) Field of Classification Search
CPC ......... H04L 65/80; H04L 67/10; H04L 67/60; H04L 43/026; H04L 43/0852; H04L 43/16; H04L 65/1069
See application file for complete search history.

(56) References Cited

U.S. PATENT DOCUMENTS

| | | | |
|---|---|---|---|
| 2018/0294967 A1 | 10/2018 | Roberts et al. | |
| 2019/0362287 A1 | 11/2019 | Achkir | |
| 2020/0125391 A1 | 4/2020 | Lee et al. | |
| 2020/0160289 A1 | 5/2020 | Mahajan et al. | |
| 2020/0211011 A1* | 7/2020 | Anderson | G06Q 20/3674 |
| 2021/0026740 A1 | 1/2021 | Guo et al. | |

FOREIGN PATENT DOCUMENTS

| | | |
|---|---|---|
| JP | 2021-18514 A | 2/2021 |
| KR | 10-2017-0006805 A | 1/2017 |
| KR | 10-1862000 B1 | 5/2018 |
| KR | 10-2019-0086747 A | 7/2019 |
| KR | 10-2020-0010905 A | 1/2020 |
| KR | 10-2020-0045854 A | 5/2020 |
| KR | 10-2392944 B1 | 4/2022 |

OTHER PUBLICATIONS

Blockchain Transaction Double Spend Proof (Year: 2020).*
Decentralized Cyber Secure Privacy Network For Cloud Communications, Computing, And Global E-commerce (Year: 2019).*
System and Method for Increasing Safety of a Smart Contract in a Chain of Units (Year: 2018).*
Method for Recording to Peer-to-Peer Distributed Ledger of Digital Asset Token Generation, Issuance, and Transaction Transfer, and Digital Asset Token Integration System (Year: 2020).*
Communication issued Sep. 29, 2023 by the European Patent Office in European Patent Application No. 21818889.4.
Office Action dated Jul. 11, 2024, issued by European Patent Office in European Patent Application No. 21818889.4.
Office Action dated Aug. 27, 2024, issued by Korean Patent Office in Korean Patent Application No. 10-2020-0067207.
Communication dated Sep. 6, 2021, issued by the International Searching Authority in counterpart International Application No. PCT/KR2021/006659 (PCT/ISA/210).
Communication dated Sep. 6, 2021, issued by the International Searching Authority in counterpart International Application No. PCT/KR2021/006659 (PCT/ISA/237).
Communication issued on May 1, 2023 by the Indian Patent Office for Indian Patent Application No. 202227072043.

* cited by examiner

| Memory pool (800) | Virtual block (824) |
|---|---|
| Unconfirmed transaction | Fee information |
| Second transaction (TX #d12h) ▼ | 0.00004 |
| First transaction (TX #a13n) ▼ | 0.00001 |
| Third transaction (TX #z23q) ▼ ⋮ ▼ | 0.000008 ⋮ |
| n-th transaction (TX #k15p) | 0.00000002 |

FIG.8B

ELECTRONIC DEVICE USING BLOCKCHAIN AND OPERATING METHOD THEREOF

CROSS-REFERENCE TO RELATED APPLICATIONS

This application is a by-pass continuation application of International Application No. PCT/KR2021/006659, filed on May 28, 2021, which based on and claims priority to Korean Patent Application No. 10-2020-0067207, filed on Jun. 3, 2020, in the Korean Intellectual Property Office, the disclosures of which are incorporated by reference herein in their entireties.

BACKGROUND

1. Field

The disclosure relates to an electronic device performing transactions by using a blockchain.

2. Description of Related Art

A blockchain is a data storage technology that splits data into blocks in a specific unit to connect the blocks in a chain form on a valid network. A blockchain node is not managed by a central server, and has a separate distributed public ledger. Cryptocurrency transaction details are recorded in the distributed public ledger, and nodes on all blockchain networks may have the same transaction details data. Accordingly, it is difficult to individually forge and falsify data stored in blockchain nodes.

Recently, various cryptocurrencies (e.g., Bitcoin, Ethereum) are emerging based on the blockchain technology. When a virtual transaction is performed through the cryptocurrency, a new block containing transaction details may be created. The created block is transmitted to all participants on the blockchain network, and only blocks approved based on a specific algorithm are stored in the blockchain node to complete the transaction.

When a transaction generated by a user is transmitted to a blockchain network, a blockchain node verifies validity of the transaction. Validated transactions are transmitted to a memory pool of the blockchain network. The memory pool may mean a space in which unconfirmed transactions not recorded in a block are stored. When a new block is created with a specific time interval (e.g., 10 minutes), transactions are recorded in the new block sequentially in a descending order of a transaction fee of the transactions among the unconfirmed transactions stored in the memory pool.

When a user sets the transaction fee of the transaction to be low, or when the number of transactions in the memory pool rapidly increases, the transaction generated by the user may be in a transmission delay status. The transaction delay status may mean a status in which the transaction is not recorded in the new block but waits in the memory pool for a long period of time. When status information of the transaction is not transferred to the user, it is difficult for the user to recognize that the transaction is in the transmission delay status. Therefore, it is difficult to generate a transaction including a high transaction fee. In addition, since the user is not able to know a transaction fee of unconfirmed transactions waiting in the memory pool, it is difficult to predict a fee of a transaction recordable in a block.

Therefore, various embodiments according to the disclosure provide an electronic device that displays status information of a transaction and recommendation fee information.

SUMMARY

According to an aspect of the disclosure, an electronic device includes a communication circuit and at least one processor connected to the communication circuit. The at least one processor is configured to generate first transaction data comprising at least a first piece of transaction data for transferring at least a part of unused transaction output values of a first address from the first address to a second address different from the first address, transmit the first transaction data to a server via the communication circuit, receive status information indicating a transmission delay status of the first transaction data in a blockchain network from the server via the communication circuit, receive recommendation fee information on transmission of the first transaction data from the server via the communication circuit, and generate second transaction data comprising at least a second piece of transaction data for transferring at least the part of the unused transaction output values of the first address from the first address to the second address, based on the recommendation fee information.

According to another aspect of the disclosure, a method of operating an electronic device includes generating first transaction data comprising at least a first piece of transaction data for transferring at least a part of unused transaction output values of a first address from the first address to a second address different from the first address, transmitting the first transaction data to a server, receiving status information indicating a transmission delay status of the first transaction data in a blockchain network from the server, receiving recommendation fee information on transmission of the first transaction data from the server, and generating second transaction data comprising at least a second piece of transaction data for transferring at least the part of the unused transaction output values of the first address from the first address to the second address, based on the recommendation fee information.

According to another aspect of the disclosure, a server includes a communication circuit and at least one processor connected to the communication circuit. The at least one processor may be configured to receive, from an electronic device via the communication circuit, first transaction data comprising at least a first piece of transaction data for transferring at least a part of unused transaction output values of a first address from the first address to a second address different from the first address, detect status information indicating a transmission delay status of the first transaction data of a blockchain network, transmit the detected status information to the electronic device via the communication circuit, calculate recommendation fee information and transmit it to the electronic device via the communication circuit, and receive, from the electronic device via the communication circuit, second transaction data comprising at least a second piece of transaction data for transferring at least the part of the unused transaction output values of the first address generated based on the recommendation fee information from the first address to the second address, based on the recommendation fee information.

According to one or more embodiments of the disclosure, transaction status information may be displayed through an electronic device. According to one or more embodiments of the disclosure, a transaction transmission delay may be avoided through an electronic device that generates a transaction based on recommendation fee information.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8B illustrates a virtual block for calculating recommendation fee information according to an embodiment of the disclosure.

DETAILED DESCRIPTION

Figure 1:
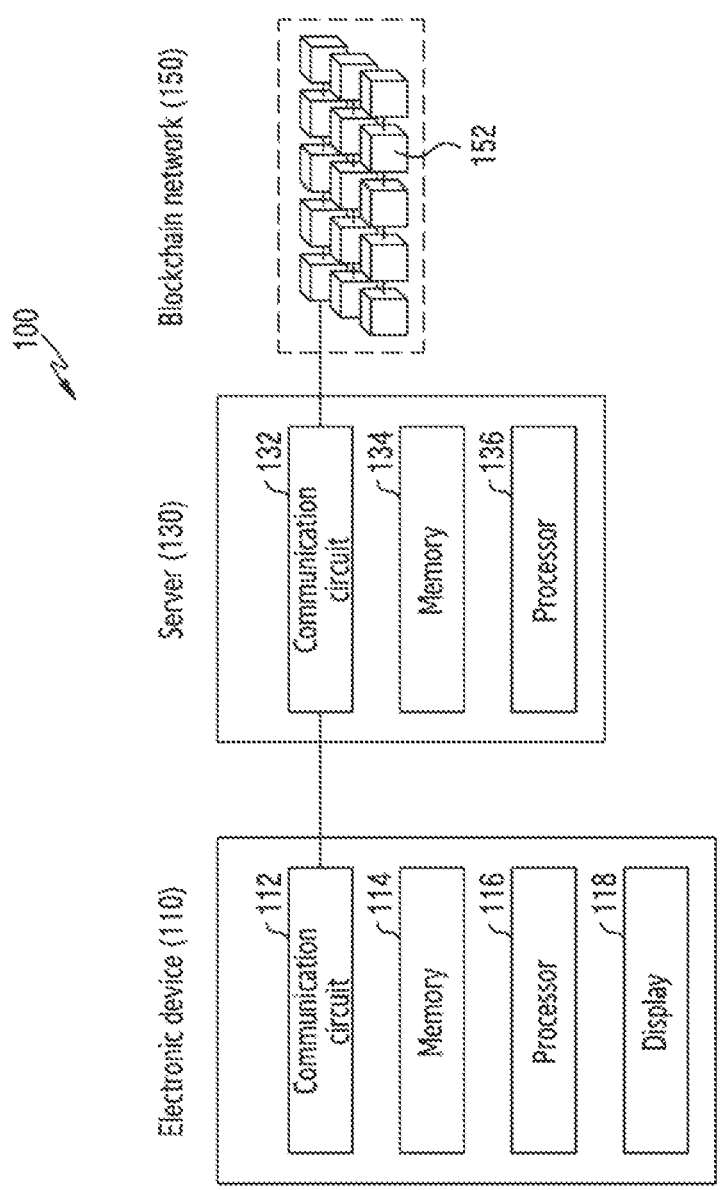
FIG. 1 illustrates a structure of a transaction system including an electronic device, a server, and a blockchain network according to an embodiment of the disclosure.

FIG. 1 illustrates a structure of a transaction system 100 including an electronic device, a server, and a blockchain network according to an embodiment of the disclosure.

Referring to FIG. 1, the transaction system 100 may include an electronic device 110, a server 130, and a blockchain network 150.

Figure 9:
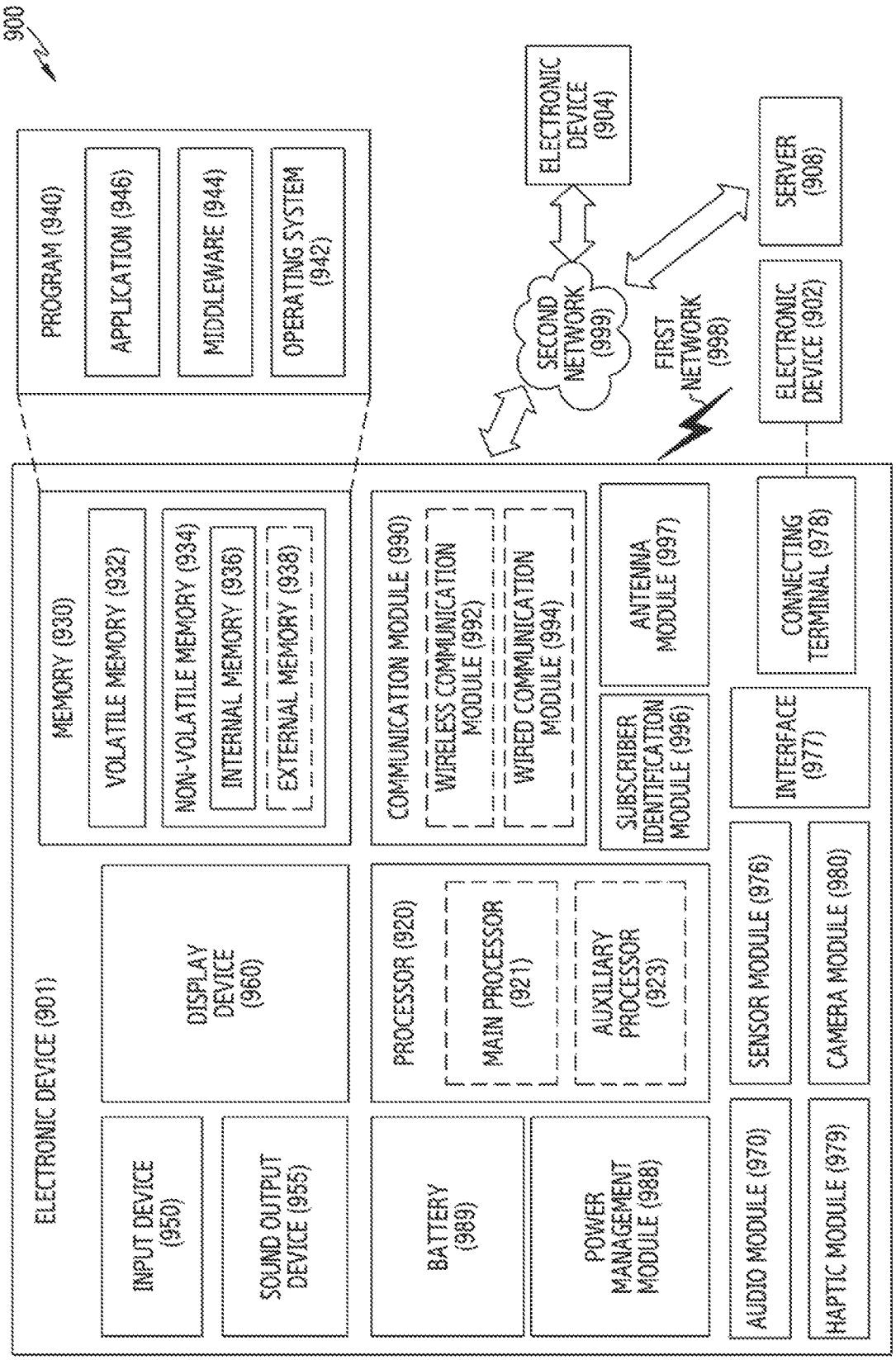
FIG. 9 is a block diagram illustrating an electronic device in a network environment according to various embodiments.

In an embodiment, the electronic device 110 (e.g., an electronic device 901 of FIG. 9) may include a communication circuit 112 (e.g., a communication module 990 of FIG. 9), a memory 114 (e.g., a memory 930 of FIG. 9), a processor 116 (e.g., a processor 920 of FIG. 9), and a display 118 (e.g., a display device 960 of FIG. 9). In an embodiment, the communication circuit 112 may establish a communication channel between the electronic device 110 and an external electronic device (e.g., the server 130) and may transmit and receive data. For example, the communication circuit 112 may transmit transaction data of the electronic device 110 performing a transaction to the server 130. The server 130 may include a manufacturer's server of the electronic device 110.

In an embodiment, the electronic device 110 may generate a key pair using an asymmetric key cryptography (e.g., a public key cryptography) to perform the transaction. In an embodiment, the memory 114 may store the generated private key. The transaction may be generated through a digital signature based on a private key. In an embodiment, the memory 114 may be a secure memory (e.g., Arm™ TrustZone™), which is a memory for providing a security environment.

In an embodiment, the display 118 may visually provide information to the outside (e.g., a user) of the electronic device 110. For example, the display 118 may display at least one of transaction generation information, balance information, transaction transmission delay information, transaction transmission completion information, and recommendation fee information of the electronic device 110.

In an embodiment, the processor 116 may calculate a fee based on the transaction data. For example, the processor 116 may generate transaction data transmitting 1.9Bitcoin (BTC) to a second address from a first address having an unused transaction output value (UTXO) with 2.1 BTC and transmits 0.05 BTC to the first address. The first address and the second address are examples of a BTC address, which is a unique identifier that serves as a virtual location where the cryptocurrency can be sent.

The processor 116 may calculate that a fee of the transaction data is 0.15 BTC, based on Vin (a set of inputs) and $V_{out}$ (a set of outputs), which are well known in BTC. In another embodiment, the processor 116 may generate transaction data, based on determined fee information. For example, the processor 116 may determine the fee for transaction data to 0.15 BTC. The processor 116 may transmit the rest of the fee (excluding 0.15 BTC) from the first address having the unused transaction output value (UTXO) with 2.1 BTC to the second address.

In an embodiment, the server 130 may include a communication circuit 132, a memory 134, and a processor 136. In an embodiment, the communication circuit 132 may establish a communication channel between the server 130 and an external device (e.g., the electronic device 110, the blockchain network 150) to transmit and receive data. For example, the communication circuit 132 may transmit, to the blockchain network 150, transaction data received from the electronic device 110. The transmitted transaction data may be stored in the blockchain node 152.

In an embodiment, the blockchain node 152 is an electronic device included in the blockchain network 150, and may serve to transmit a transaction in the blockchain network 150. The electronic device may be the same as or at least partially similar to the electronic devices 901 and 902 of FIG. 9 and/or the electronic device 110, but without being limited thereto, may be implemented with some of electronic devices or system components (e.g., a processor, a memory).

In an embodiment, the processor 136 may receive data from the electronic device 110 via the communication circuit 132. In an embodiment, the processor 136 may monitor the blockchain network 150 via the communication circuit 132. For example, the processor 136 may use a message exchange library (e.g., jsonRPC, ZeroMQ) between the blockchain node 152 and the server 130 to identify new block generation information and transaction information or the like in a memory pool of the blockchain network 150. In an embodiment, the memory pool is a space in which unconfirmed transaction information that is not recorded in a block is stored. The memory pool may be located in a memory (e.g., the memory 930 of FIG. 9) of the blockchain node 152. In addition, transaction information in the memory pool may be shared by using the plurality of blockchain nodes 152 connected via the blockchain network 150. According to one embodiment, FIG. 1 illustrates a transaction system in which data generated in the electronic device 110 is transmitted to the blockchain network 150 via the server 130. In another embodiment, the data generated in the electronic device 110 may be directly, without using the server 130, transmitted to the blockchain network 150. That is, the electronic device 110 may generate transaction data and directly transmit the generated transaction data to the blockchain network 150, and may transmit, to the server 130, data indicating that the transaction data was generated by the electronic device 110. The server 130 may start monitoring of the blockchain network 150, based on the received data.

Figure 2:
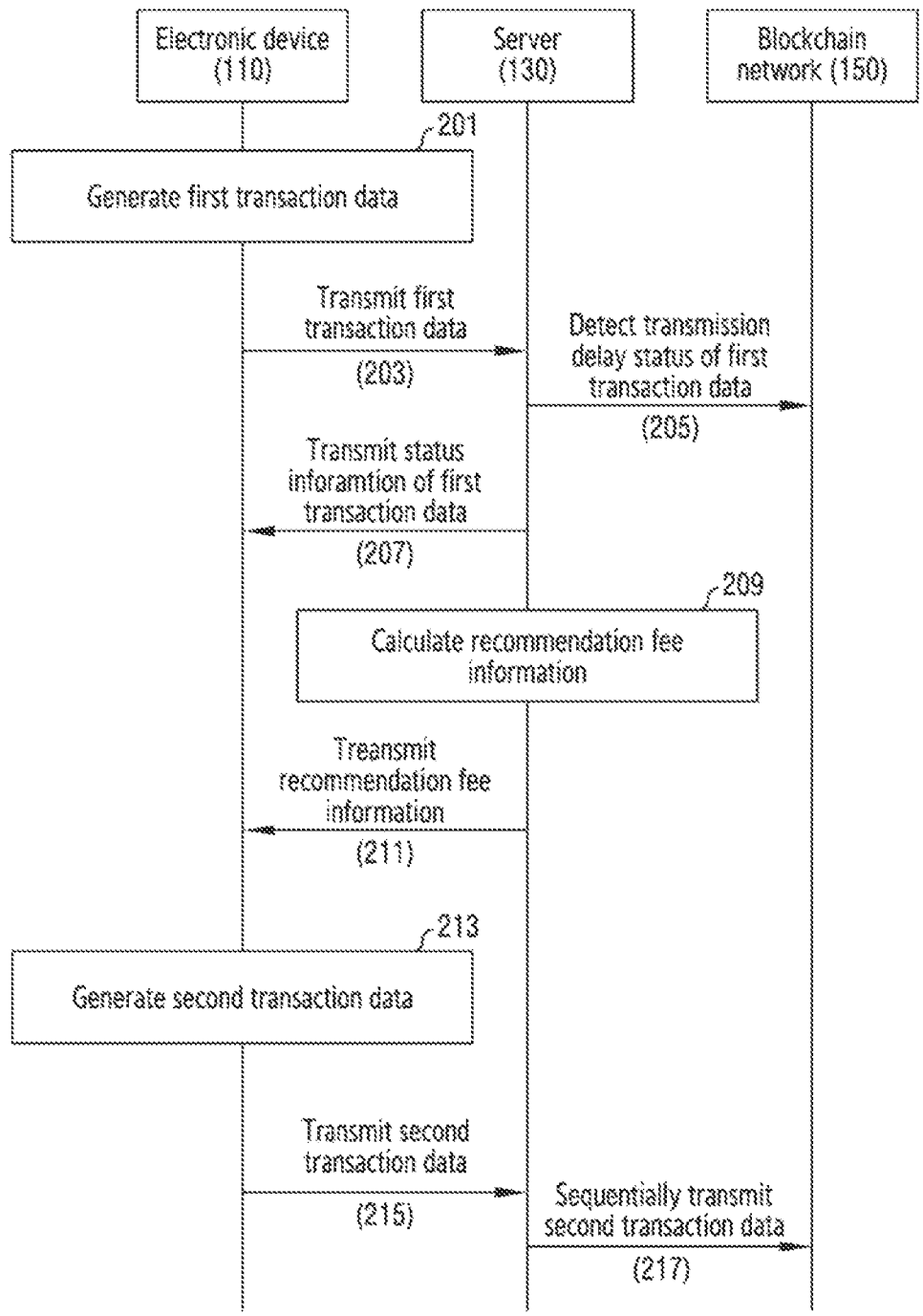
FIG. 2 illustrates an operational flowchart of a transaction system according to an embodiment of the disclosure.

FIG. 2 illustrates an operational flowchart of a transaction system according to an embodiment.

Referring to FIG. 2, in operation 210, the electronic device 110 may generate first transaction data. For example, the electronic device 110 may generate the first transaction data including at least a first piece of transaction data for transferring a part of unused transaction output values of a first address from the first address to a second address. In an embodiment, the first transaction data includes a plurality of pieces of transaction data that may include different pieces of fee information. For example, the electronic device 110 may generate the first transaction data including the plurality of pieces of transaction data by setting a fee range (e.g., 1 to 3 satoshi/byte). In an embodiment, the fee range may be set by a user. In another embodiment, the fee range may be set based on a recommendation fee received from the server.

According to an embodiment, in operation 203, the electronic device 110 may transmit the first transaction data to the server 130. In an embodiment, the electronic device 110 may transmit transaction data to the server 130, based on a digital signature based on a private key.

According to an embodiment, in operation 205, the server 130 may detect a transmission delay status of the first transaction data, which occurs in the blockchain network 150. However, when the first transaction data includes the plurality of pieces of transaction data, before performing the operation 205, the server 130 may perform an operation of sequentially transmitting the first transaction data to the blockchain network 150, based on fee information.

In an embodiment, the server 130 may start monitoring of the blockchain network 150, based on the first transaction data received from the electronic device 110. In an embodiment, the transmission delay status may indicate a status in which even any one piece of transaction data of first transaction data (including at least the first piece of transaction data) is not recorded in a new block and is waiting in a memory pool of the blockchain network 150. For example, the first transaction data may include transaction data #1-1 (first part of the first transaction data) having fee information of 1 satoshi/byte, transaction data #1-2 (second part of the first transaction data) having fee information of 2 satoshi/byte, and transaction data #1-3 (third part of transaction data) having fee information of 3 satoshi/byte. The transaction data #1-1 (first part of the first transaction data) having lowest fee information (herein, 1 satoshi/byte) may be transmitted first to the blockchain network 150 among the pieces (parts) of first transaction data. In this case, when the transaction data #1-1 (first part of the first transaction data) is waiting in the memory pool of the blockchain network 150, it may be determined that the transaction data #1-1 (first part of the first transaction data) is in a 0-confirmation status. When a new block is created according to a specific time interval (e.g., 10 minutes), transaction data may be recorded in the new block sequentially starting from transaction data including a highest fee. It may be determined that the transaction data recorded in the new block is in a 1-confirmation status. Since there is a large amount of transaction data having higher fee information (e.g., 10 satoshi/byte) than that (the fee information) of the first transaction data in the memory pool of the blockchain network 150, the first transaction data may be present in a waiting status in the memory pool for a long period of time (e.g., 30 minutes). It may be determined that the transaction data waiting in the memory pool of the blockchain network 150 is in the 0-confirmation status. When a time for which the first transaction data is in the 0-confirmation status in the memory pool exceeds a threshold transmission time (e.g., 10 minutes), the server 130 may determine a status of the transaction data #1-1 (first part of the first transaction data) as the transmission delay status. The threshold transmission time may be randomly set in the server 130 and/or the electronic device 110, or may be set according to the user's setting.

Thereafter, as the transaction data #1-1 (first part of the first transaction data) determined to be in the transmission delay status is deleted from the memory pool, the transaction data #1-2 (second part of the first transaction data) having higher fee information (e.g., 2 satoshi/byte) than that (the fee information) of the transaction data #1-1 (first part of the first transaction data) may be transmitted to the blockchain network 150. When a time for which the transaction data #1-2 (second part of the first transaction data) is in the 0-confirmation status in the memory pool exceeds a threshold transmission time, a status of the transaction data #1-2 (second part of the first transaction data) may be determined as the transmission delay status. As such, when a status of the transaction data #1-3 (third part of transaction data) transmitted after the transaction data #1-2 (second part of the first transaction data) is deleted from the memory pool is determined as the transmission delay status, the server 130 may determine that the first transaction data (e.g., the transaction data #1-1 (first part of the first transaction data), the transaction data #1-2 (second part of the first transaction data), and the transaction data #1-3 (third part of transaction data) is in the transmission delay status.

According to an embodiment, in operation 207, the server 130 may transmit status information of the first transaction data to the electronic device 110. The status information of the first transaction data may indicate that the first transaction data is in the transmission delay status. In an embodiment, the server 130 may transmit the status information of the first transaction data to the electronic device 110 through a push notification. For example, a specific application (e.g., decentralized application (DApp)) generating the first transaction data may interwork with the server 130. The server 130 may transmit the status information of the first transaction data detected by monitoring the blockchain network 150 to the specific application of the electronic device 110 through the push notification. The push notification may have a form of a message (Firebase Cloud Messaging (FCM)) transmitted on an app basis.

According to an embodiment, in operation 209, the server 130 may calculate recommendation fee information, for example, on transmission of the first transaction data. In an embodiment, the server 130 may identify (e.g., monitor)

transaction information in the memory pool of the blockchain network 150 via the communication circuit 132. In an embodiment, the server 130 may calculate a recommendation fee, based on fee information of unconfirmed transactions which are waiting in the memory pool. For example, the server 130 may arrange the unconfirmed transactions waiting in the memory pool in a descending order of fee information of the transactions. The server 130 may calculate recommendation fee information having a 'fast' transfer rate, based on fee information of unconfirmed transactions having high fee information (e.g., unconfirmed transactions having top 25% fee information). The server 130 may calculate recommendation fee information having a 'normal' transfer rate, based on fee information of unconfirmed transactions having intermediate fee information (e.g., unconfirmed transactions having fee information of the top 25 to 50%). The server 130 may calculate recommendation fee information having a 'slow' transfer rate, based on fee information of unconfirmed transactions having 'low' fee information (e.g., unconfirmed transactions having fee information of the top 50 to 75%). In an embodiment, reference values (e.g., top 25%, 50%, and 75%) for 'fast,' 'normal,' and 'slow' transfer rates may vary, based on parameter values set in the server.

In an embodiment, the recommendation fee information may indicate a single fee value (e.g., 0.00005 BTC) calculated based on a plurality of unconfirmed transactions. In another embodiment, the recommendation fee information may indicate a range of fees (e.g., 0.00004 BTC to 0.00006 BTC) calculated based on the plurality of unconfirmed transactions. In another embodiment, the recommendation fee information may indicate at least one of a fee having a 'fast' transfer rate, a fee having a 'normal' transfer rate, and a fee having a 'slow' transfer rate.

In an embodiment, the operation 209 may be performed sequentially after the operation 207, or may be performed in parallel with the operation 207. For example, the server 130 may calculate the recommendation fee, after transmitting the status information to the electronic device 110 in response to detecting of the transmission delay status of the first transaction data. As another example, the server 130 may transmit the status information to the electronic device 110 after calculating the recommendation fee information based on the detected transmission delay status of the first transaction data. In this case, the recommendation fee information may be transmitted to the electronic device 110 together with the status information.

According to an embodiment, in operation 211, the server 130 may transmit the recommendation fee information to the electronic device 110. In an embodiment, the server 130 may transmit the recommendation fee information to the electronic device 110 through a push notification.

According to an embodiment, in operation 213, the electronic device 110 may generate second transaction data. For example, the electronic device 110 may generate the second transaction data including at least a second piece of transaction data for transferring a part of unused transaction output values of the first address from the first address to the second address. In an embodiment, the electronic device 110 may generate the second transaction data, based on received recommendation fee information. For example, the electronic device 110 may identify a range of fees (e.g., 0.00004 BTC to 0.00006 BTC) based on the recommendation fee information having a 'fast' transfer rate. The electronic device 110 may generate the second transaction data including the range of fees, by performing a digital signature based on a private key.

According to an embodiment, in operation 215, the electronic device 110 may transmit the second transaction data to the server 130.

According to an embodiment, when the second transaction data includes a plurality of pieces of transaction data, in operation 217, the server 130 may sequentially transmit the second transaction data to the blockchain network 150, based on the fee information. In an embodiment, when any one piece of transaction data (e.g., transaction data corresponding to priority) of second transaction data is recorded in a new block after transaction data is transmitted sequentially starting from transaction data including lowest fee information to the blockchain network 150 among the pieces of second transaction data, the server 130 may obtain status information indicating a transmission completion status.

Figure 3:
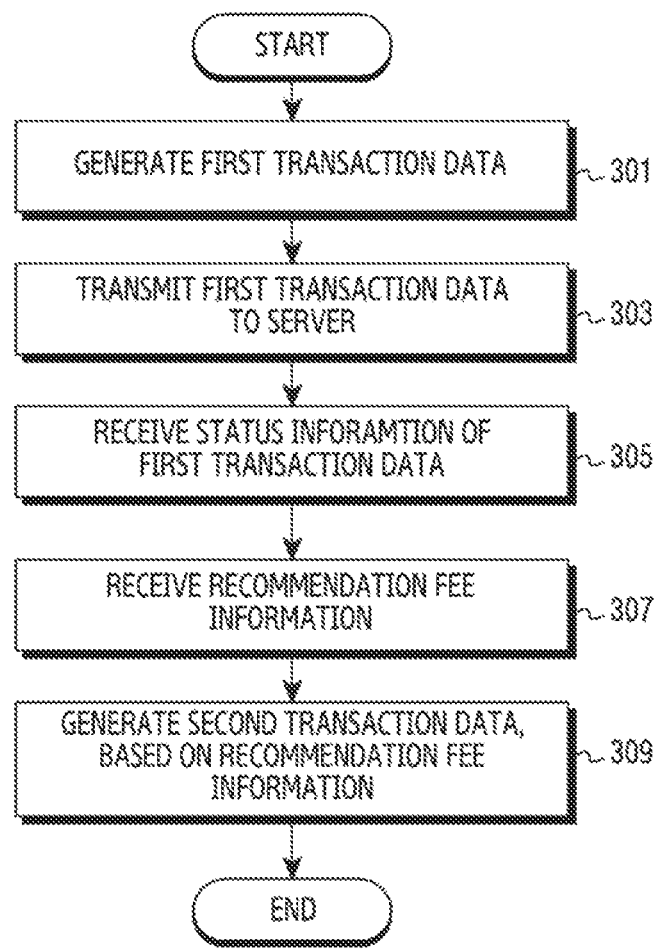
FIG. 3 illustrates an operational flowchart of an electronic device according to an embodiment of the disclosure.

FIG. 3 illustrates an operational flowchart of an electronic device according to an embodiment. In regard to the description of FIG. 3, the same or similar description described above may be omitted. In an embodiment, operations 301 to 309 of FIG. 3 may be performed by a processor (e.g., the processor 116 of FIG. 1) of an electronic device (e.g., the electronic device 110 of FIG. 1).

Referring to FIG. 3, in operation 301, the electronic device 110 may generate first transaction data. For example, the first transaction data may include transaction data #1-1 (first part of the first transaction data) including first fee information (e.g., 0.00000003 BTC (3satoshi)) and transaction data #1-2 (second part of the first transaction data) including second fee information (e.g., 0.00000005 BTC (5satoshi)) of a fee higher than that of the first fee information. In an embodiment, the first fee information and the second fee information may be set by a user. In another embodiment, the first fee information and the second fee information may be received from a server (e.g., the server 130 of FIG. 1).

According to an embodiment, in operation 303, the electronic device 110 may transmit the first transaction data to the server. In an embodiment, as the first transaction data is generated based on a digital signature through a private key, the electronic device 110 may transmit the first transaction data to the server (e.g., the server 130 of FIG. 1).

According to an embodiment, in operation 305, the electronic device 110 may receive status information of the first transaction data from the server 130. In an embodiment, the electronic device 110 may use a display (e.g., the display 118 of FIG. 1) to display that the first transaction data is in a transmission delay status. For example, the electronic device 110 may display to a notification bar disposed at an upper portion of the display 118 a notification indicating that the first transaction data is in the transmission delay status. In an embodiment, the notification may include a notification suggesting a fee change.

According to an embodiment, in operation 307, the electronic device 110 may receive recommendation fee information from the server 130. In an embodiment, the electronic device 110 may receive a recommendation fee, based on real-time transaction information of a blockchain network (e.g., the blockchain network 150 of FIG. 1). For example, the recommendation fee may indicate a range of fees that is recordable in a new block to be created within a short period of time (e.g., 10 minutes) at a current time point. In an embodiment, the operation 307 may be performed sequentially after the operation 305, or may be performed in parallel with the operation 305.

According to an embodiment, in operation 309, the electronic device 110 may generate the second transaction data, based on the recommendation fee information. For example, the second transaction data may include transaction data #2-1 (first part of the second transaction data) including third fee information (e.g., 0.0000002 BTC (20satoshi)) and transaction data #2-2 (second part of the second transaction data) including fourth fee information (e.g. 0.0000003 BTC (30satoshi)) higher than the third fee information. The third fee information and the fourth fee information may be included in a recommendation fee (e.g., 0.0000002 BTC to 0.0000003 BTC) recordable in a new block to be created within a short period of time at a current time point.

Figure 4:
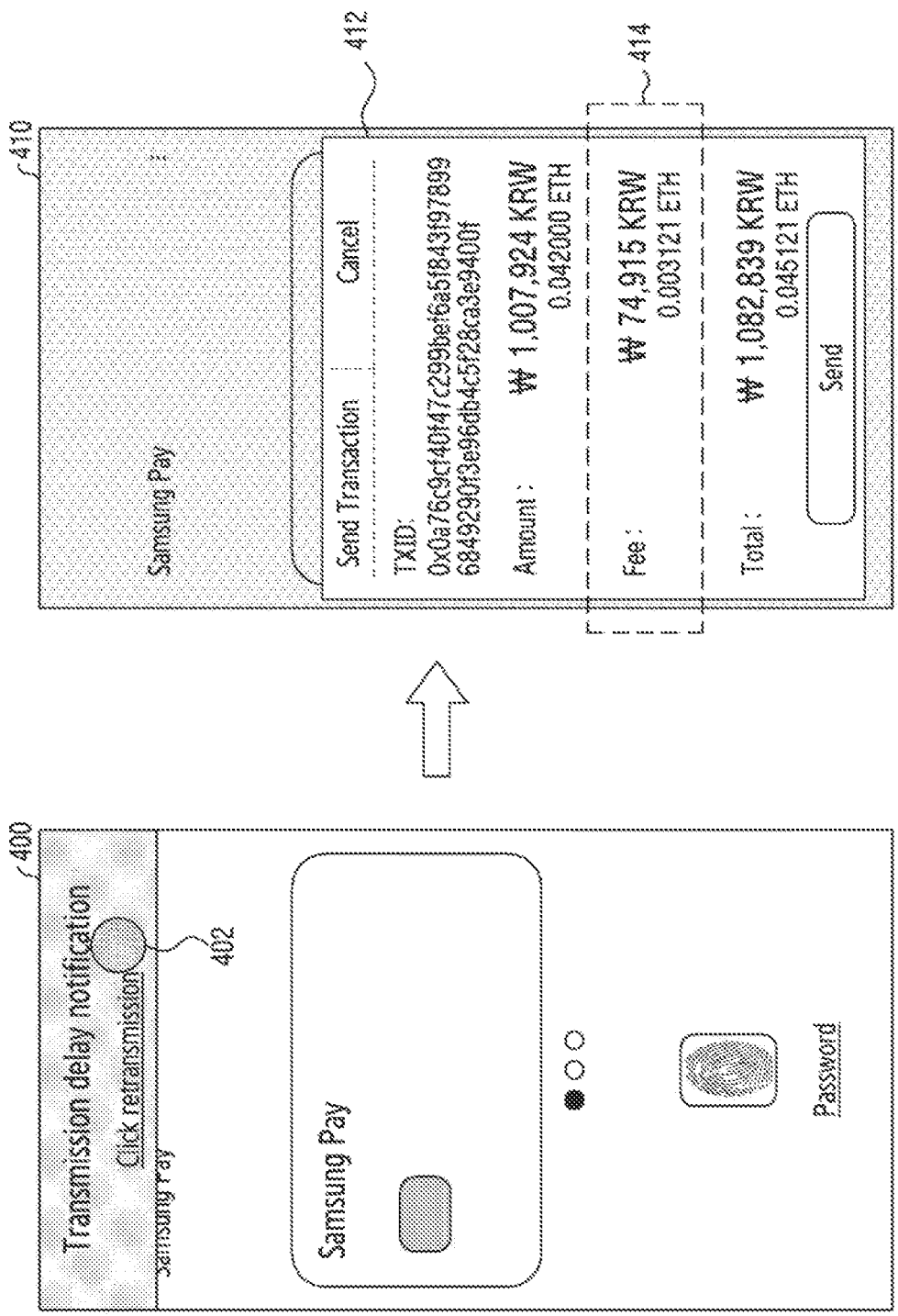
FIG. 4 illustrates a User Interface (UI) status of an electronic device receiving transaction status information and recommendation fee information according to an embodiment of the disclosure.

FIG. 4 illustrates a User Interface (UI) status of an electronic device which has received transaction status information and recommendation fee information according to an embodiment. In regard to the description of FIG. 4, the same or similar description described above may be omitted.

Referring to FIG. 4, an electronic device (e.g., the electronic device 110 of FIG. 1) may provide a first UI 400 including a transmission delay notification of transaction data through a display (e.g., the display 118 of FIG. 1). The transmission delay notification may be displayed through a notification bar on the display 118, or may be displayed through a pop-up window. In an embodiment, the transmission delay notification may include information (e.g., "Click retransmission") suggesting retransmission of transaction data. In an embodiment, the electronic device 110 may receive a touch input 402 for a region displaying the transmission delay notification.

In an embodiment, the electronic device 110 may display a second UI 410 including newly generated transaction data through the display 118. In an embodiment, the electronic device 110 may display newly generated transaction data 412 through a layer popup which may be superimposed on the first UI 400. For example, the transaction data 412 may include a Transaction ID (TXID), a remittance amount, a fee, and a total amount. In an embodiment, the transaction data 412 may be generated based on recommendation fee information 414 received from a server (e.g., the server 130 of FIG. 1). For example, transaction data in a transmission delay status may include a remittance amount of "₩ 1,022,019 KRW", a fee of "₩ 60,820 KRW", and a total amount of "₩ 1,082,839 KRW." As the electronic device 110 receives the touch input 402 for the region displaying the transmission delay notification, the transaction data 412 may be generated by reflecting "₩ 74,915 KRW" which is the recommendation fee information 414 received from the server 130. In FIG. 4, the remittance amount is changed from "₩ 1,022,019 KRW" to "₩ 1,007,924 KRW," due to the increased fee, from "₩ 60,820 KRW" to "₩ 74,915 KRW."

Figure 5:
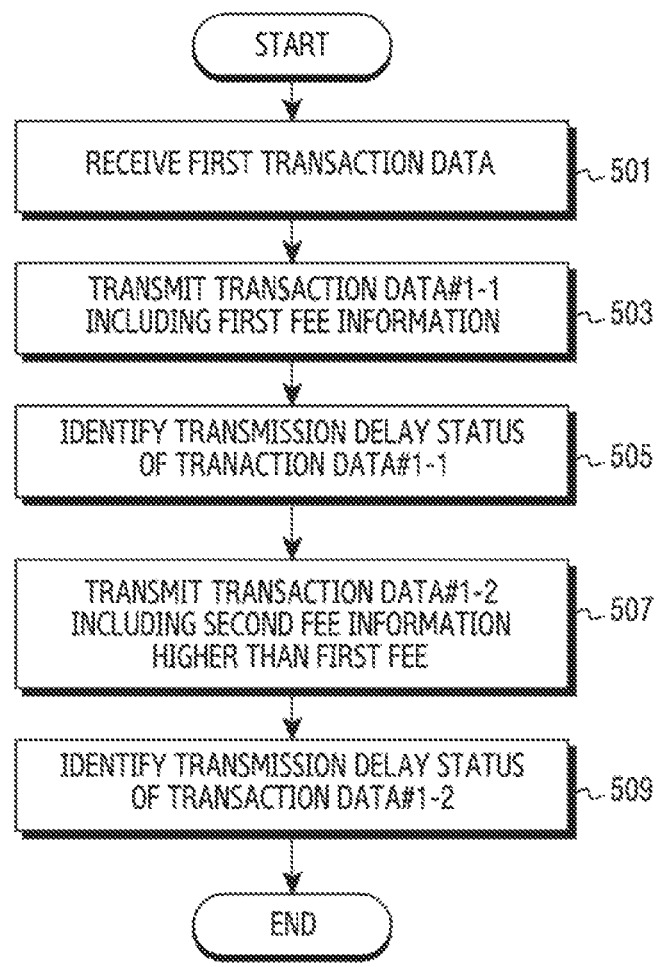
FIG. 5 illustrates an operational flowchart of a server detecting a transmission delay status of a transaction, when first transaction data includes a plurality of pieces of transaction data according to an embodiment of the disclosure.

FIG. 5 illustrates an operational flowchart of a server which detects a transmission delay status of a transaction, when first transaction data includes a plurality of pieces of transaction data according to an embodiment. Operations of FIG. 5 may be associated with the operation 205 of FIG. 2. In regard to the description of FIG. 5, the same or similar description described above may be omitted. In an embodiment, operations 501 to 509 of FIG. 5 may be performed by a processor (e.g., the processor 136 of FIG. 1) of a server (e.g., the server 130 of FIG. 1).

Referring to FIG. 5, in operation 501, the server 130 may receive first transaction data including a plurality of pieces of transaction data from an electronic device (e.g., the electronic device 110 of FIG. 1). For example, the first transaction data may include transaction data #1-1 (first part of the first transaction data) including first fee information (e.g., 0.00000003 BTC (3satoshi)) and transaction data #1-2 (second part of the first transaction data) including second fee information (e.g., 0.00000005 BTC (5satoshi)) of a fee higher than that of the first fee information.

According to an embodiment, in operation 503, the server 130 may transmit the transaction data #1-1 (first part of the first transaction data) including first fee information to a blockchain network (e.g., the blockchain network 150 of FIG. 1). In an embodiment, the server 130 may arrange fee information of the first transaction data in an ascending order, and may transmit transaction data to the blockchain network 150 sequentially starting from transaction data including lowest fee information. For example, the server may transmit the transaction data #1-1 (first part of the first transaction data) including a fee of 0.00000003 BTC (3 satoshi) to the blockchain network 150 before the transaction data #1-2 (second part of the first transaction data) including a fed of 0.00000005 (5 satoshi).

According to an embodiment, in operation 505, the server 130 may identify a transmission delay status of the transaction data #1-1 (first part of the first transaction data). In an embodiment, when the transaction data #1-1 (first part of the first transaction data) is not recorded in a new block during a threshold transmission time (e.g., 20 minutes), for example, which is set by a user, the server 130 may determine that the transaction data #1-1 (first part of the first transaction data) is in the transmission delay status.

According to an embodiment, in operation 507, the server 130 may transmit to the blockchain network 150 the transaction data #1-2 (second part of the first transaction data) including second fee information higher than the first fee information. In an embodiment, after transmitting the transaction data #1-1 (first part of the first transaction data) including lowest fee information of the first transaction data, the server 130 may sequentially transmit the transaction data #1-2 (second part of the first transaction data) including second lowest fee information. Although the first transaction data includes only two pieces or parts of transaction data (the first part of the first transaction data and the second part of the first transaction data) for convenience of description, the number of pieces of transaction data is not limited to two and may vary depending on setting of a fee range.

According to an embodiment, in operation 509, the server 130 may identify the transmission delay status of the transaction data #1-2 (second part of the first transaction data). In an embodiment, when the transaction data #1-2 (second part of the first transaction data) is not recorded in a new block during a threshold transmission time, for example, which is set by the user, the server 130 may determine that the transaction data #1-2 (second part of the first transaction data) is in the transmission delay status. In another embodiment, when the transaction data #1-2 (second part of the first transaction data) is recorded in the new block within the threshold transmission time set by the user, the server 130 may determine that the transaction data #1-2 (second part of the first transaction data) is in a transmission completion status. In this case, operations subsequent to the operation 205 of FIG. 2 may be omitted.

Figure 6:
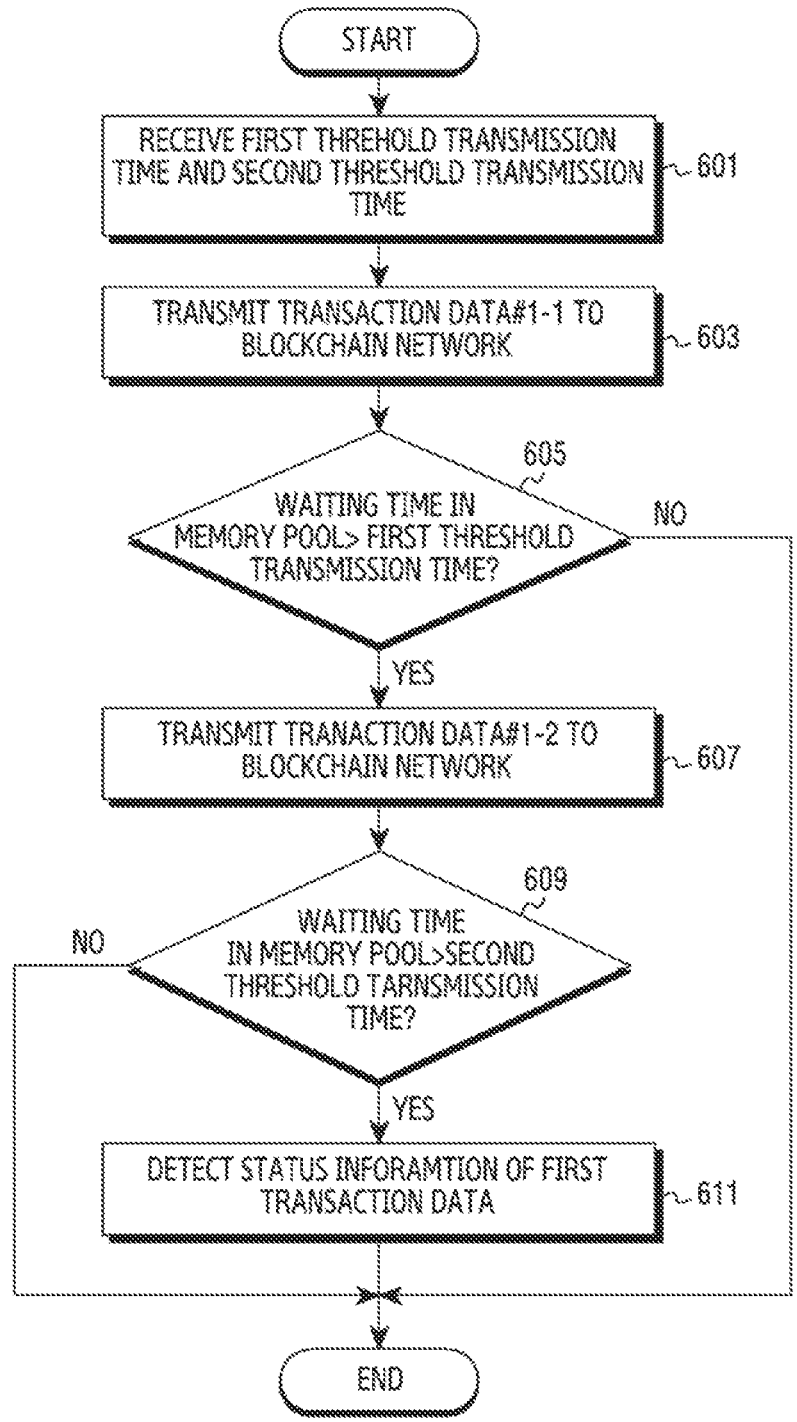
FIG. 6 illustrates an operational flowchart for determining status information of transaction data, based on a threshold transmission time for fee information according to an embodiment of the disclosure.

FIG. 6 illustrates an operational flowchart for determining status information of transaction data, based on a threshold transmission time for fee information according to an embodiment. Operations of FIG. 6 may be associated with the operation 205 of FIG. 2. In regard to the description of FIG. 6, the same or similar description described above may be omitted. In an embodiment, the operations 601 to 611 of FIG. 6 may be performed by a processor (e.g., the processor 136 of FIG. 1) of a server (e.g., the server 130 of FIG. 1).

Referring to FIG. 6, in operation 601, the server 130 may receive, from an electronic device (e.g., the electronic device 110 of FIG. 1), information on a first threshold transmission time for first fee information and a second threshold transmission time for second fee information of a fee higher than that of the first fee information. For example, when the first fee information corresponds to a fee having a 'normal' transfer rate, the first threshold transmission time may correspond to a 3-confirmation time (approximately 30 minutes). When the second fee information of a fee higher than that of the first fee information corresponds to a fee having a 'fast'" transfer rate, the second threshold transmission time may correspond to a 1-confirmation time (approximately 10 minutes). The confirmation time may be used to calculate a time required to record transaction data in a new block, based on a time required to generate the new block.

According to an embodiment, in operation 603, the server 130 may transmit transaction data #1-1 (first part of the first transaction data) to a blockchain network (e.g., the blockchain network 150 of FIG. 1). Descriptions on the operation 603 may correspond to the descriptions on the operation 503 of FIG. 5.

According to an embodiment, in operation 605, the server 130 may identify whether a waiting time of the transaction data #1-1 (first part of the first transaction data) in a memory pool exceeds the first threshold transmission time (e.g., a 3-confirmation time (30 minutes)). For example, the server 130 may measure the waiting time of transaction data #1-1 (first part of the first transaction data) in the memory pool from a time at which the transaction data #1-1 (first part of the first transaction data) starts to be transmitted to the blockchain network 150. In an embodiment, when the waiting time of transaction data #1-1 (first part of the first transaction data) in the memory pool exceeds the first threshold transmission time (Yes in operation 605), in operation 607, the server 130 may transmit transaction data #1-2 (second part of the first transaction data) to the blockchain network 150.

According to an embodiment, in operation 609, the server 130 may identify whether a waiting time of the transaction data #1-2 (second part of the first transaction data) in a memory pool exceeds a second threshold transmission time (e.g., a 1-confirmation time (10 minutes)). In an embodiment, when the waiting time of transaction data #1-2 (second part of the first transaction data) in the memory pool exceeds the second threshold transmission time (Yes in operation 609), in operation 611, the server 130 may determine status information of the first transaction data. The status information of the first transaction data may indicate that the transaction data #1-1 (first part of the first transaction data) and the transaction data #1-2 (second part of the first transaction data) are in a transmission delay status.

According to an embodiment, when the waiting time of transaction data #1-1 (first part of the first transaction data) in the memory pool does not exceed the first threshold transmission time as a result of executing the operation 605 (No in operation 605), the server 130 may determine that the transaction data #1-1 (first part of the first transaction data) is in the transmission completion status. According to another embodiment, when the waiting time of transaction data #1-2 (second part of the first transaction data) in the memory pool does not exceed the second threshold transmission time as the result of executing the operation 609 (No in operation 609), the server 130 may determine that the transaction data #1-2 (second part of the first transaction data) is in the transmission completion status.

Figure 7A:
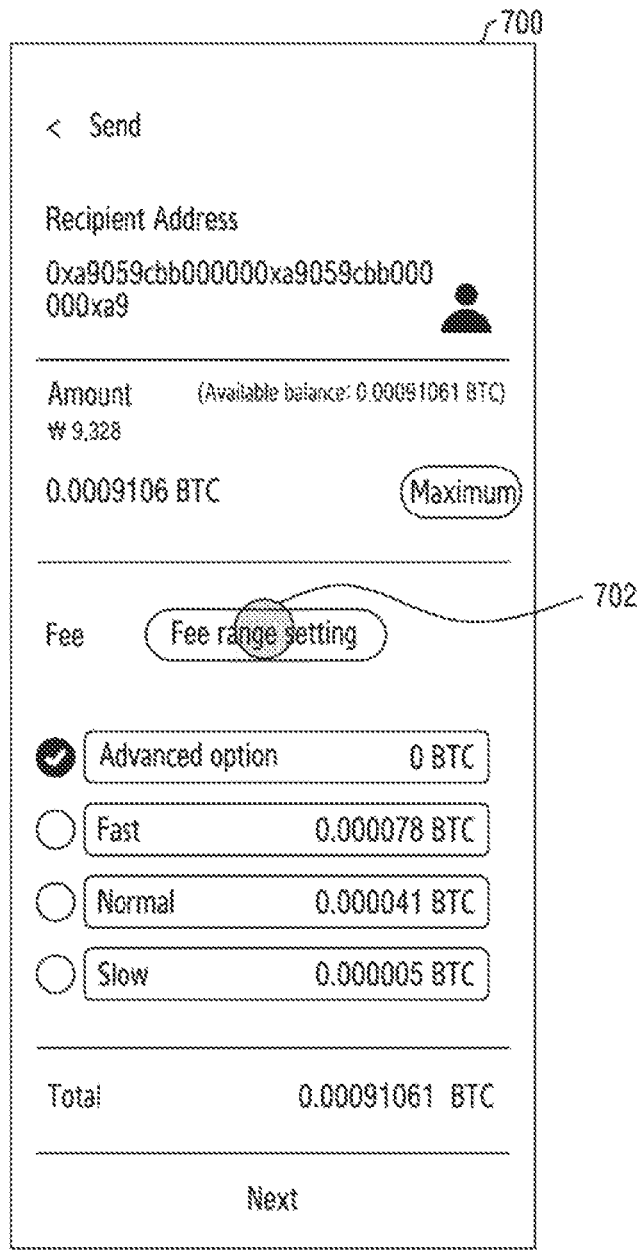
FIG. 7A illustrates a first UI status of an electronic device setting a fee range according to an embodiment of the disclosure.
Figure 7B:
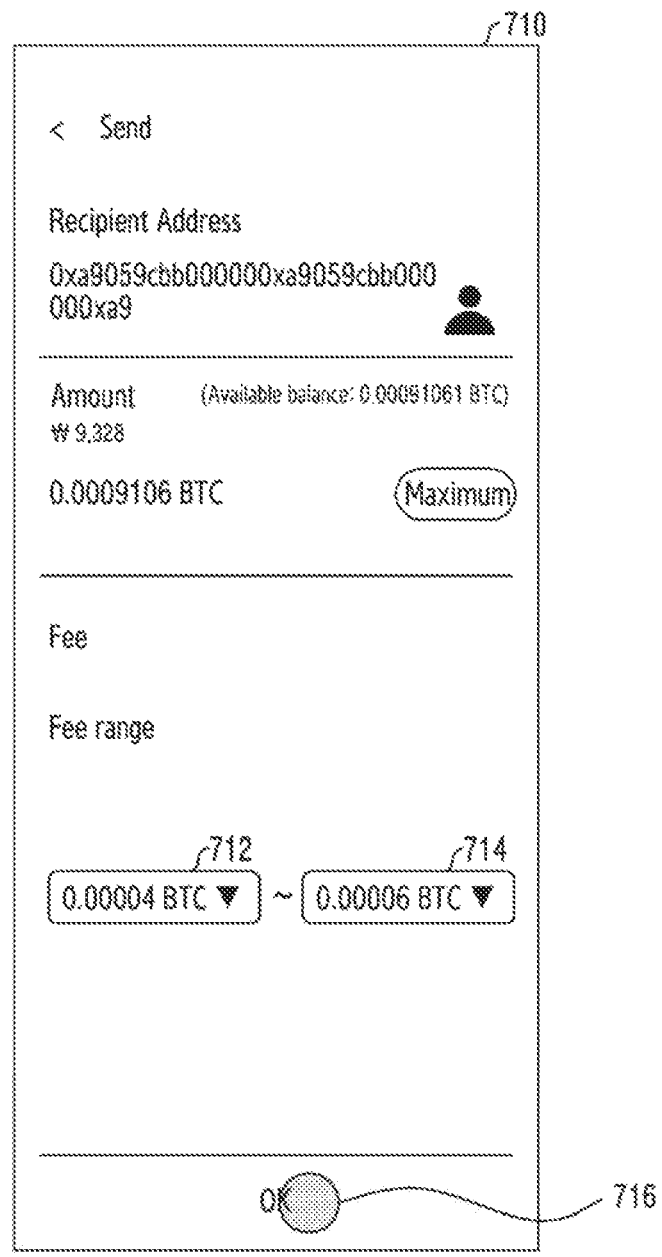
FIG. 7B illustrates a second UI status of an electronic device setting a fee range according to an embodiment of the disclosure.
Figure 7C:
FIG. 7C illustrates a third UI status of an electronic device setting a fee range according to an embodiment of the disclosure.

FIG. 7A illustrates a first UI status of an electronic device which sets a fee range according to an embodiment. FIG. 7B illustrates a second UI status of an electronic device which sets a fee range according to an embodiment. FIG. 7C illustrates a third UI status of an electronic device which sets a fee range according to an embodiment. FIG. 7A to FIG. 7C may correspond to a UI status corresponding to the operation 201 or 213 of FIG. 2.

Referring to FIG. 7A, an electronic device (e.g., the electronic device 110 of FIG. 1) may display a first UI 700 for generating transaction data through a display (e.g., the display 118 of FIG. 1). The first UI 700 may include transaction data including a fee, a remittance amount, and a recipient address for receiving the remittance amount. In an embodiment, the electronic device 110 may display recommendation fee information (e.g., "fast: 0.000078 BTC", "normal: 0.000041 BTC", and "slow: 0.000005 BTC") received from a server (e.g., the server 130 of FIG. 1) in a region in which a fee is displayed. In an embodiment, the electronic device 110 may receive a touch input 702 for a "fee range setting" region disposed to at least a portion of the region in which the fee is displayed. Upon receiving the touch input 702 for the "fee range setting" region, the electronic device 110 may display a UI (e.g., a second UI 710 of FIG. 7B) capable of setting a fee range through the display 118.

Referring to FIG. 7B, the electronic device 110 may display the second UI 710 capable of setting the fee range through the display 118. In an embodiment, the fee range may be calculated based on a recommendation fee received from the server 130. For example, at a time at which the second UI 710 is first displayed, the electronic device 110 may display a recommendation fee (e.g., the lowest fee value of 00004 BTC and the greatest fee value of 0.00006 BTC) received from the server 130 in a first region 712 indicating the lowest fee value and a second region 714 indicating the greatest fee value. In an embodiment, the electronic device 110 may change the fee range, based on a user input for the first region 712 indicating the lowest fee value and the second region 714 indicating the greatest fee value. For example, upon receiving the user input through the first region 712 indicating the lowest fee value and the second region 714 indicating the greatest fee value, the electronic device 110 may display an input window (e.g., a text box) and an input UI (e.g., a keyboard UI) to allow the user to input a value. Alternatively, the electronic device 110 may display values in a predetermined range, based on the indicated fee value in the form of a list (e.g., a drop-down list). For example, the electronic device 110 may change the lowest fee value to 0.00003 BTC and the greatest fee value to 0.00007 BTC, based on the user input. In an embodiment, the electronic device 110 may receive a touch input 716 for determining the fee range as the recommendation fee or the fee range set by the user.

Referring to FIG. 7C, the electronic device 110 may display a third UI 720 including information related to a plurality of pieces of transaction data through the display 118. In an embodiment, the third UI 720 may include information related to a plurality of pieces of transaction data generated based on the determined fee range. For example, the electronic device 110 may generate transaction data TX9$a$13$n$ including the lowest fee value of 0.00004 BTC and transaction data TX9$c$21$d$ including the highest fee value of 0.00006 BTC. In addition, the electronic device 110 may generate a plurality of pieces of transaction data, based on a fee value corresponding to a value between the lowest fee value and the highest fee value. For example, the electronic device 110 may generate the transaction data TX9$b$23$p$ including 0.00005 BTC belonging to the determined fee range. Although the plurality of pieces of transaction data are generated with an interval of 0.00001 BTC (1000 satoshi) for the fee range, the interval value may vary depending on a user's setting or any setting in the electronic device. For example, when the plurality of pieces of transaction data are generated with an interval of 0.000001BTC (100 satoshi), the electronic device 110 may generate a plurality of pieces of transaction data including fees of 0.00004 BTC, 0.000041 BTC, 0.000042 BTC, . . . , 0.000059 BTC, 0.00006 BTC. The electronic device 110 may display information (e.g., TX ID, fee information) related to the generated plurality of pieces of transaction data through the display 118 by including the information in the third UI 720.

Figure 8A:
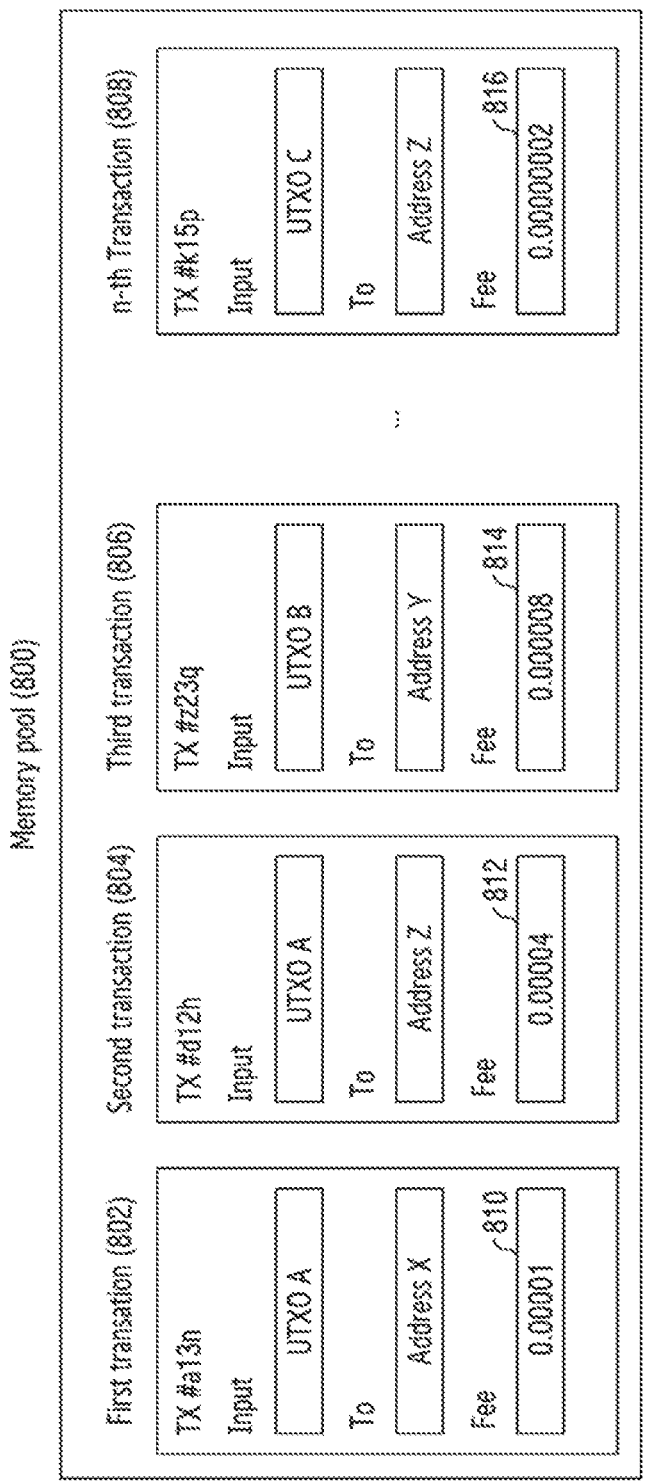
FIG. 8A illustrates a memory pool of a blockchain network according to an embodiment of the disclosure.

FIG. 8A illustrates a memory pool 800 of the blockchain network 150 according to an embodiment.

Referring to FIG. 8A, the memory pool 800 may be a space in which unconfirmed transactions not recorded in a block are stored. In an embodiment, the memory pool 800 may be temporarily located in a memory of a blockchain node (e.g., the blockchain node 152 of FIG. 1). In an embodiment, the blockchain node 152 may verify validity of received transaction data and then add only validated transaction data to the memory pool 800. In an embodiment, the unconfirmed transaction stored in the memory pool 800 may include a plurality of transactions including a first transaction 802, a second transaction 804, a third transaction 806, and an n-th transaction 808. In an embodiment, transactions recordable in a newly created block among the plurality of transactions may be determined based on a fee. In an embodiment, the memory pool 800 may arrange and store the plurality of transactions in a descending order of a fee. For example, the memory pool 800 may arrange and store the second transaction 804 having a fee 812 of 0.00004 BTC, the first transaction 802 having a fee 810 of 0.00001 BTC, and the third transaction 802 having a fee 814 of 0.000008 BTC, in that order.

FIG. 8B illustrates a virtual block for calculating recommendation fee information according to an embodiment.

Referring to FIG. 8B, some transactions among a plurality of transactions arranged in a memory pool may be included in a block to be created by a miner. After some transactions are included in the block to be created, the miner may create a block by sequentially substituting nonce values, and may propagate the created block to the blockchain node 152 only when the nonce value is matched. In an embodiment, some transactions may consist of transactions corresponding to a priority among the plurality of transactions.

In an embodiment, a server (e.g., the server 130 of FIG. 1) may identify the memory pool 800 of a blockchain network (e.g., the blockchain network 150 of FIG. 1), and may create a virtual block 824. For example, the server 130 may create the virtual block 824 having a size of 1 MB, and may add upper parts of transaction data of the memory pool 800, arranged in a descending order of a fee. The server 130 may add the transaction data until a size of the transaction data added to the virtual block 824 reaches 1 MB. In an embodiment, the server 130 may calculate a recommendation fee, based on a transaction speed and fee information of the transaction data added to the virtual block 824. For example, the server 130 may calculate an upper-50% fee recordable in a block to be created later, based on a current transaction speed and fee information of a plurality of transactions (e.g., the second transaction, the first transaction, the third transaction, etc.) included in the virtual block 824 as the recommendation fee.

FIG. 9 is a block diagram illustrating an electronic device 901 in a network environment 900 according to various embodiments.

Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module(SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, a keyboard, or a digital pen (e.g., a stylus pen).

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., PCB). According to an embodiment, the antenna module 997 may include a plurality of antennas. In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a display apparatus;
a communication circuit; and
at least one processor connected to the display apparatus, the communication circuit, wherein the at least one processor is configured to:
generate first transaction data comprising at least a first piece of transaction data for transferring at least a part of unused transaction output values of a first address from the first address to a second address different from the first address;
transmit the first transaction data to a server via the communication circuit; receive status information from the server via the communication circuit, the status information indicating a transmission delay status of the first transaction data in a blockchain network;
control to display, through the display apparatus, a first user interface comprising the transmission delay status of the first transaction data;
receive recommendation fee information on transmission of the first transaction data from the server, via the communication circuit;
control to display, through the display apparatus, a second user interface comprising recommended fee indicated by the recommendation fee information; and
generate second transaction data comprising at least a second piece of transaction data for transferring at least a part of the unused transaction output values of the first address from the first address to the second address, based on the recommend fee indicated by the recommendation fee information.

2. The electronic device of claim 1, wherein, when the second transaction data comprises a plurality of second pieces of transaction data, each of the plurality of second pieces of transaction data comprises different pieces of fee information.

3. The electronic device of claim 1, wherein:
when the first transaction data comprises a plurality of first pieces of transaction data, the plurality of first pieces of transaction data comprise a first one of the plurality of first pieces of transaction data comprising first fee information, and a second one of the plurality of first pieces of transaction data comprising second fee information of a fee higher than first fee.

4. The electronic device of claim 3, wherein the at least one processor is further configured to:
transmit a first threshold transmission time that is set for the first fee information and a second threshold transmission time that is set for the second fee information to the server via the communication circuit, wherein the second threshold transmission time is shorter than the first threshold transmission time; and
receive the status information on a condition that a first waiting time of the first one of the plurality of first pieces of transaction data in a memory pool of the blockchain network exceeds the first threshold transmission time and a second waiting time of the second one of the plurality of first pieces of transaction data in the memory pool exceeds the second threshold transmission time.

5. The electronic device of claim 3, wherein, based on transmitting of the first transaction data to the server, the at least one processor transmits the first one of the plurality of first pieces of transaction data, comprising the first fee information, of the first transaction data to the blockchain network.

6. The electronic device of claim 5, wherein, based on the first o one of the plurality of first pieces of transaction data identified by the server as being in the transmission delay status, the at least one processor transmits the second one of the plurality of first pieces of transaction data comprising the second fee information, of the first transaction data to the blockchain network.

7. The electronic device of claim 1, wherein the recommendation fee information is calculated based on at least one unconfirmed transaction that waits in a memory pool of the blockchain network, and the recommendation fee for the second transaction data is higher than a fee for the first transaction data.

8. The electronic device of claim 1, wherein the at least one processor is further configured to:
set a threshold transmission time for determining the transmission delay status of the first transaction data, and
receive the status information, on a condition that a waiting time of the first transaction data in a memory pool of the blockchain network exceeds the threshold transmission time.

9. A method of operating an electronic device comprising a display apparatus, comprising a display apparatus the method comprising:
generating first transaction data comprising at least a first piece of transaction data for transferring at least a part of unused transaction output values of a first address from the first address to a second address that is different from the first address;
transmitting the first transaction data to a server;
receiving status information indicating a transmission delay status of the first transaction data in a blockchain network from the server;
controlling to display, through the display apparatus, a first user interface comprising the transmission delay status of the first transaction data;
receiving recommendation fee information on transmission of the first transaction data from the server;
controlling to display, through the display apparatus, a second user interface comprising recommended fee indicated by the recommendation fee information; and
generating second transaction data comprising at least a second piece of transaction data for transferring at least a part of the unused transaction output values of the first address from the first address to the second address, based on the recommended fee indicated by recommendation fee information.

10. The method of claim 9, wherein, when the second transaction data comprises a plurality of second pieces of transaction data, each of the plurality of second pieces of transaction data comprises different pieces of fee information.

11. The method of claim 9, wherein, when the first transaction data comprises a plurality of first pieces of transaction data, the plurality of first pieces of transaction data comprises a first one of the plurality of first pieces of transaction data comprising first fee information, and a second one of the plurality of first pieces of transaction data comprising second fee information of a fee higher than first fee.

12. The method of claim 11, further comprising:
transmitting a first threshold transmission time which is set for the first fee information and a second threshold transmission time which is set for the second fee information to the server, wherein the second threshold transmission time is shorter than the first threshold transmission time; and receiving the status information on a condition that a first waiting time of the first one of the plurality of first pieces of transaction data in a memory pool of the blockchain network exceeds the first threshold transmission time and a second waiting time of the second one of the plurality of first pieces of transaction data exceeds the second threshold transmission time.

13. The method of claim 11, wherein, in response to transmitting of the first transaction data to the server, the first one of the plurality of first pieces of transaction data, comprising the first fee information, of the first transaction data is transmitted to the blockchain network.

14. The method of claim 13, wherein, based on the first one of the plurality of first pieces of transaction data identified by the server as being in the transmission delay status, the second one of the plurality of first pieces of transaction data, comprising the second fee information, of the first transaction data is transmitted to the blockchain network.

15. The method of claim 9, wherein the recommendation fee information is calculated based on at least one unconfirmed transaction that waits in a memory pool of the blockchain network.

16. A server comprising:
a communication circuit; and
at least one processor connected to the communication circuit, wherein the at least one processor is configured to:
receive, from an electronic device, first transaction data comprising at least a first piece of transaction data for transferring a first address to a second address, at least a part of unused transaction output values of the first address that is different from the second address;
detect status information indicating a transmission delay status of the first transaction data in a blockchain network;
transmit the detected status information to the electronic device through the communication circuit;
determine recommendation fee information on transmission of the first transaction data;
transmit the recommendation fee information to the electronic device through the communication circuit;
receive, from the electronic device through the communication circuit, second transaction data comprising at least a second piece of transaction data for transferring at least a part of the unused transaction output values of the first address from the first address to the second address based on the recommendation fee information.

17. The server of claim 16, when the second transaction data comprises a plurality of second pieces of transaction data, each of the plurality of second pieces of transaction data comprises different pieces of fee information.

18. The server of claim 16, when the first transaction data comprises a plurality of first pieces of transaction data, the plurality of first pieces of transaction data comprises a first one of the plurality of first pieces of transaction data comprising first fee information, and a second one of the plurality of first pieces of transaction data comprising second fee information of a fee higher than first fee.

19. The server of claim 18, wherein the at least one processor is further configured to:
receive a first threshold transmission time that is set for the first fee information and a second threshold transmission time that is set for the second fee information to the server via the communication circuit, wherein the second threshold transmission time is shorter than the first threshold transmission time;
transmit the first one of the plurality of first pieces of transaction data to the blockchain network;
based on the transmission of the first one of the plurality of first pieces of transaction data, compare a first waiting time of the first one of the plurality of first pieces of transaction data in a memory pool of the blockchain network with the first threshold transmission time; and
when the first waiting time exceeds the first threshold transmission time, transmit the second one of the plurality of first pieces of transaction data to the blockchain network.

20. The server of claim 19, wherein the at least one processor is further configured to:
based on the transmission of the second one of the plurality of first pieces of transaction data, compare a second waiting time of the second one of the plurality of first pieces of transaction data in the memory pool of the blockchain network with the second threshold transmission time; and
when the second waiting time exceeds the second threshold transmission time, transmit the status information to the electronic device.

* * * * *